(12) United States Patent
Hong

(10) Patent No.: US 6,371,271 B1
(45) Date of Patent: Apr. 16, 2002

(54) LOCKING APPARATUS FOR CHANGE LEVER OF VEHICLE

(75) Inventor: Jong-ho Hong, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/711,399

(22) Filed: Nov. 13, 2000

(30) Foreign Application Priority Data

Dec. 13, 1999 (KR) .......................................... 99-57050

(51) Int. Cl.[7] .............................................. B60K 41/26
(52) U.S. Cl. .................................................. 192/220.3
(58) Field of Search ........................... 192/220.4, 200.5, 192/200.6, 200.7; 74/472.21; 477/96, 99

(56) References Cited

U.S. PATENT DOCUMENTS

| | | | |
|---|---|---|---|
| 4,919,242 A | * 4/1990 | Muramatsu et al. | 192/4 A |
| 4,938,042 A | * 7/1990 | Muramatsu | 70/245 |
| 4,986,399 A | * 1/1991 | Gokee | 192/4 A |
| 4,991,700 A | * 2/1991 | Koga | 192/4 A |
| 5,058,462 A | * 10/1991 | Killiany et al. | 74/878 |
| 5,647,464 A | * 7/1997 | Snell et al. | 192/4 A |
| 5,695,429 A | * 12/1997 | Kataumi et al. | 477/96 |
| 5,996,763 A | * 12/1999 | Tsuge | 192/220.3 |
| 6,231,476 B1 | * 5/2001 | Reasoner et al. | 477/99 |

\* cited by examiner

*Primary Examiner*—Charles A Marmor
*Assistant Examiner*—Saúl Rodríguez
(74) *Attorney, Agent, or Firm*—Davis & Bujold, P.L.L.C.

(57) ABSTRACT

Disclosed is a locking apparatus for the change lever of a vehicle, which can reliably conduct an operation for preventing a change lever from being operated unless a brake pedal is depressed in a parking state. The apparatus includes a pedal-end slide pin, a lever-end slide pin, and a cable which are operatively connected to the brake pedal. A guide pin is mounted to the change lever in such a fashion that it conducts an arc movement in accordance with a hinging movement of the change lever. The guide pin is selectively engaged with the lever-end slide pin in order to prevent the change lever from being operated in a parking state unless the brake pedal is depressed. An arc-shaped engagement preventing member is operatively connected to the guide pin. The engagement preventing member allows an engagement between the lever-end slide pin and guide pin when the change lever is positioned at a parking range position while preventing the engagement between the lever-end slide pin and guide pin, when the change lever is positioned at a position other than the parking range position, to allow the hinging movement of the change lever. By this configuration, it is possible to reduce the costs while reducing the rate of failure. It is also possible to reduce the number of elements used while using elements of a small size, thereby allowing an easy layout setting.

1 Claim, 1 Drawing Sheet

-PRIOR ART-

LOCKING APPARATUS FOR CHANGE LEVER OF VEHICLE

BACKGROUND OF THE INVENTION

1. Field of the Invention

The present invention relates to a locking apparatus for the change lever of a vehicle, and more particularly to a locking apparatus for the change lever of a vehicle, which has a simple mechanical configuration using no actuator required in an electrical system, thereby being capable of reducing the costs and a limitation on the installation space thereof while eliminating the use of a separate emergency releasing device.

2. Description of the Related Art

Typically, vehicles including an automatic transmission have a change lever provided with security means. That is, such a change lever is configured, for a security, in such a fashion that it cannot be operated unless a brake pedal is depressed when the change lever is positioned at a parking range position. Referring to FIG. 2, a conventional locking device for such a security is illustrated. As shown in FIG. 2, an actuator 102 is disposed in front of a guide plate 101 adapted to guide a shift of a change lever 103. A locking lever 104 is mounted to the actuator 102 in order to prevent the change lever 103 from being shifted under the condition in which the change lever 103 is positioned at a parking range position. The guide plate 101 is provided with a switch 105 adapted to sense a state in which the change lever 103 is positioned at the parking range position. The switch 105 is electrically connected to an electronic control unit, to which the actuator 102 is also electrically connected. A sensor or switch adapted to sense a depressed state of a brake pedal is also electrically coupled to the electronic control unit.

When the switch 105 senses the state in which the change lever 103 is positioned at the parking range position, and the sensor or switch associated with the brake pedal senses the state in which the brake pedal is not depressed, they inform the electronic control unit of the sensed results. Based on the information from those switches, the electronic control unit prevents the actuator 102 from being actuated. In this state, accordingly, the locking state of the locking lever 104 is not released. As a result, the change lever 103 cannot be shifted.

When the driver depresses the brake pedal under the above mentioned condition, the depression of the brake pedal is recognized by the electronic control unit which, in turn, actuates the actuator 102. In accordance with the actuation of the actuator 102, the locking state of the locking lever 104 is released. As a result, the change lever 103 can be shifted.

However, such a conventional locking device have a drawback in that there is an increase in the costs because it uses the actuator 102 controlled by electrical signals. Furthermore, it is difficult to install the actuator 102 in a limited space because it has a large volume. This results in a difficulty in setting the layout of the vehicle. Where the electrical system is out of order, the locking device cannot operate. In this case, the vehicle cannot be driven. In order to solve this problem, it is necessary to install a separate emergency releasing device.

SUMMARY OF THE INVENTION

Therefore, an object of the invention is to provide a locking apparatus for the change lever of a vehicle, which has a simple mechanical configuration capable of allowing the change lever to be maintained at a locked state thereof, without using any components of an electrical system, thereby achieving a cost reduction and an easy determination of an installation space thereof while eliminating the use of a separate emergency releasing device.

In accordance with the present invention, this object is accomplished by providing a locking apparatus for a change lever of a vehicle comprising: a pedal-end cable housing arranged in the vicinity of a brake pedal included in the vehicle; a first slide pin slidably mounted in the pedal-end cable housing so that it slides between a first position thereof and a second position thereof; a first spring arranged in the pedal-end cable housing and adapted to always urge the first slide pin toward the first position; a depressing member mounted to a brake pedal included in the vehicle and adapted to depress the first slide pin against a resilience of the first spring unless the brake pedal is depressed, thereby maintaining the first slide pin at the second position; a lever-end cable housing mounted to a change lever case in which a change lever is hingably mounted at a lower end thereof by a hinge pin; a guide pin mounted to the lower end of the change lever so that it conducts an arc movement about the hinge pin in accordance with a hinging movement of the change lever; a second slide pin slidably mounted in the lever-end cable housing and adapted to be selectively engaged with the guide pin, the second slide pin sliding between a first position thereof, in which the second slide pin is disengaged from the guide pin to allow the hinging movement of the change lever, and a second position thereof in which the second pin is engaged with the guide pin to prevent the hinging movement of the change lever; a cable connected between the first and second slide pins and adapted to operatively connect the first and second slide pins to each other so that it urges the second slide pin toward the first position thereof in response to the slide movement of the first slide pin toward the first position of the first slide pin while urging the second slide pin toward the second position thereof in response to the slide movement of the first slide pin toward the second position of the first slide pin; a second spring arranged in the lever-end cable housing and adapted to always urge the second slide pin toward the second position thereof; and an arc-shaped engagement preventing member operatively connected to the guide pin and adapted to allow the slide movement of the second slide pin toward the second position thereof when the change lever is positioned at a parking range position while maintaining the second slide pin at the first position thereof against a resilience of the second spring, when the change lever is positioned at a position other than the parking range position, to allow the hinging movement of the change lever.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described with reference to the annexed drawings.

Figure 1:
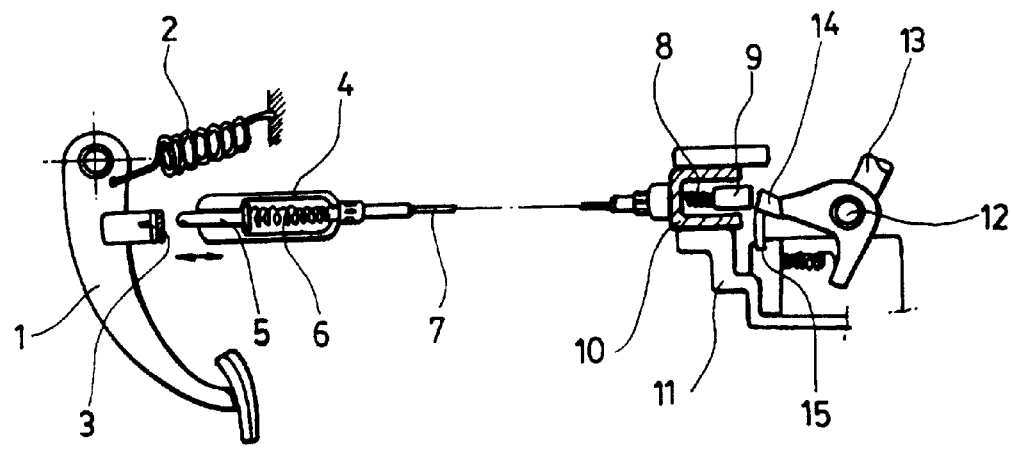
FIG. 1 is a schematic view illustrating a locking apparatus for the change lever of a vehicle in accordance with the present invention.
Figure 2:
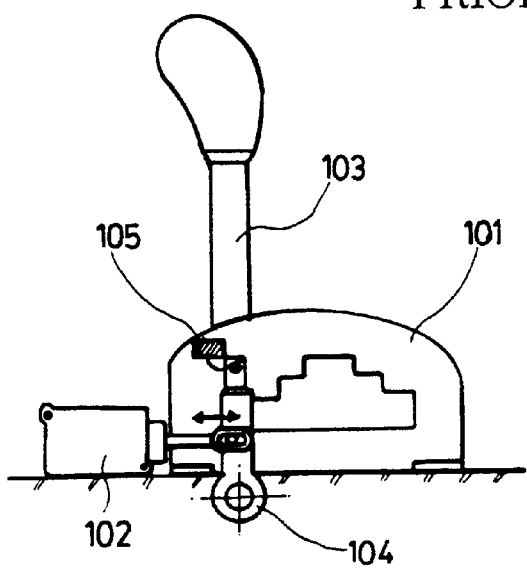
FIG. 2 is a schematic view illustrating a conventional locking apparatus for the change lever of a vehicle.

FIG. 1 illustrates a locking apparatus for the change lever of a vehicle in accordance with the present invention. The locking apparatus includes a depressing member 3 mounted to a brake pedal 1 included in the vehicle. A compression coil spring 2 is mounted to the brake pedal 1 in order to allow the brake pedal 1 to return from its braking position to its releasing position when the driver releases a depressing force applied to the brake pedal 1. The depressing member 3 has the form of a protrusion protruded from the brake pedal 1. The locking apparatus also includes a pedal-end cable housing 4 arranged in the vicinity of the depressing member 3. A slide pin 5 is mounted in the pedal-end cable housing 4 in such a fashion that it faces the depressing member 3 at one end thereof and is slidable toward or away from the depressing member 3. The slide pin 5 is always urged toward the depressing member 3 by a compression coil spring 6 arranged in the pedal-end cable housing 4. A cable 7 is connected at one end thereof to the other end of the slide pin 5. The other end of the cable 7 extends through the pedal-end cable housing 4 in a direction away from the pedal-end cable housing 4. The locking apparatus further includes a lever-end cable housing 10 fixedly mounted to a change lever case 11 in which a change lever 13 is hingably mounted at a lower end thereof by a hinge pin 12. A guide pin 14 is mounted to the lower end of the change lever 13 so that it conducts an arc movement about the hinge pin 12 in accordance with a hinging movement of the change lever 13. A slide pin 9 is mounted in the lever-end cable housing 10 in such a fashion that it faces the guide pin 14 and is slidable toward or away from the guide pin 14. The slide pin 9 is connected at one end thereof to the other end of the cable 7. The slide pin 9 is always urged toward the guide pin 14 by a compression coil spring 8 arranged in the lever-end cable housing 10. The guide pin 14 of the change lever 13 is provided with an arc-shaped engagement preventing member 15 extending downwardly from a free end of the guide pin 14. The engagement preventing member 15 has a curvature identical to the arc movement line of the guide pin 14. The guide pin 14 is positioned at a level lower than that of the slide pin 9 in a state in which the change lever 13 is positioned at a parking range position.

In a normal state in which the brake pedal of the vehicle is not depressed, the slide pin 5 of the pedal-end cable housing 4 is in a state depressed by the depressing member 3 mounted to the brake pedal 1. As a result, the cable 7 is in a state shifted in a rear direction, that is, toward the change lever case 11. As the cable 7 is rearwardly shifted, the slide pin 9 moves rearwardly, that is, toward the change lever 14, by virtue of the resilience of the compression coil spring 8. Since the guide pin 14 is positioned at a level lower than that of the slide pin 9 in a state in which the change lever 13 is positioned at a parking range position, the guide pin 14 and arc-shaped engagement preventing member 15 do not interfere with the rearward movement of the slide pin 9. In the rearwardly shifted state, the slide pin 9 is engaged with the guide pin 14, thereby preventing the change lever 13 from hinging about the hinge pin 12 when the driver 13 rearwardly pulls the change lever 13 for a speed change.

In order to allow the compression coil spring 8 urging the slide pin 5 to be compressed by a compression of the compression coil spring 6 urging the slide pin 9, the compression coil springs 6 and 8 are designed in such a fashion that the resilience of the compression coil spring 6 is higher than that of the compression coil spring 8.

When the driver depresses the brake pedal 1, the depressing member 3 is released from the slide pin 5 of the pedal-end cable housing 4, thereby causing the slide pin 5 to move forwardly, that is, toward the brake pedal 1, by virtue of the resilience of the compression coil spring 6. As a result, the cable 7 connected to the slide pin 5 is forwardly shifted, thereby causing the slide pin 9 to move forwardly in the lever-end cable housing 10 away from the guide pin 14, so that it is disengaged from the guide pin 14. Accordingly, the change lever 13 can be freely manipulated for a speed change.

Meanwhile, when the change lever 13 is positioned at a running range position other than the parking range position, that is, during a running of the vehicle, the guide pin 14 is positioned at a level higher than that of the slide pin 9. In this state, the slide pin 9 may be protruded toward the guide pin 14 unless the brake pedal 1 is depressed. Nevertheless, the change lever 13 can be freely manipulated for a speed change because the guide pin 14 is positioned at a level higher than that of the slide pin 9. However, if the engagement preventing member 15 is not provided at the guide pin 14, it is then impossible to hingably move the change lever 13 from the running range position to the parking range position because the slide pin 9 is in a state protruded below the guide pin 14, thereby preventing the guide pin 14 from moving downwardly. In order to eliminate such a problem, the engagement preventing member 15 is provided at the guide pin 14. The engagement preventing member 15 serves to prevent the slide pin 9 from being protruded below the guide pin 14 during a manipulation of the change lever 13 for a speed change.

Accordingly, there is no problem in manipulating the change lever 13 during a period of time from the point of time when the vehicle is begun to run from a parking state to the point of time when the vehicle stops for its parking. Thus, the function of the locking apparatus for preventing the change lever from being manipulated at the parking range position of the change lever unless the brake pedal is depressed can be reliably achieved.

As apparent from the above description, the locking apparatus of the present invention can reliably conduct an operation for preventing the change lever from being operated in a parking state unless the brake pedal is depressed, using simple mechanical members such as a cable, springs, and slide pins. Accordingly, it is possible to reduce the costs while reducing the rate of failure, as compared to conventional cases using an actuator adapted to release a locking lever. It is also possible to reduce the number of elements used while using elements having a small size, thereby allowing an easy layout setting. Moreover, it is unnecessary to use a separate emergency releasing device.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A locking apparatus for a change lever of a vehicle comprising:
   a pedal-end cable housing arranged in the vicinity of a brake pedal included in the vehicle;
   a first slide pin slidably mounted in the pedal-end cable housing so that it slides between a first position thereof and a second position thereof;
   a first spring arranged in the pedal-end cable housing and adapted to always urge the first slide pin toward the first position;
   a depressing member mounted to a brake pedal included in the vehicle and adapted to depress the first slide pin against a resilience of the first spring unless the brake pedal is depressed, thereby maintaining the first slide pin at the second position;

a lever-end cable housing mounted to a change lever case in which a change lever is hingably mounted at a lower end thereof by a hinge pin;

a guide pin mounted to the lower end of the change lever so that it conducts an arc movement about the hinge pin in accordance with a hinging movement of the change lever;

a second slide pin slidably mounted in the lever-end cable housing and adapted to be selectively engaged with the guide pin, the second slide pin sliding between a first position thereof, in which the second slide pin is disengaged from the guide pin to allow the hinging movement of the change lever, and a second position thereof in which the second pin is engaged with the guide pin to prevent the hinging movement of the change lever;

a cable connected between the first and second slide pins and adapted to operatively connect the first and second slide pins to each other so that it urges the second slide pin toward the first position thereof in response to the slide movement of the first slide pin toward the first position of the first slide pin while urging the second slide pin toward the second position thereof in response to the slide movement of the first slide pin toward the second position of the first slide pin;

a second spring arranged in the lever-end cable housing and adapted to always urge the second slide pin toward the second position thereof; and an arc-shaped engagement preventing member operatively connected to the guide pin and adapted to allow the slide movement of the second slide pin toward the second position thereof when the change lever is positioned at a parking range position while maintaining the second slide pin at the first position thereof against a resilience of the second spring, when the change lever is positioned at a position other than the parking range position, to allow the hinging movement of the change lever.

* * * * *